(12) United States Patent
Hu

(10) Patent No.: US 7,846,407 B2
(45) Date of Patent: Dec. 7, 2010

(54) SELF-CONCENTRATING ABSORBENT FOR ACID GAS SEPARATION

(76) Inventor: Liang Hu, 297 Creek Ave., Hampton, VA (US) 23669

( * ) Notice: Subject to any disclaimer, the term of this patent is extended or adjusted under 35 U.S.C. 154(b) by 0 days.

(21) Appl. No.: 12/430,998

(22) Filed: Apr. 28, 2009

(65) Prior Publication Data
US 2009/0263302 A1 Oct. 22, 2009

Related U.S. Application Data

(63) Continuation-in-part of application No. 12/250,257, filed on Oct. 13, 2008, now Pat. No. 7,718,151, which is a continuation-in-part of application No. 11/279,095, filed on Apr. 7, 2006, now Pat. No. 7,541,011.

(51) Int. Cl.
| | |
|---|---|
| *B01D 53/40* | (2006.01) |
| *B01D 53/48* | (2006.01) |
| *B01D 53/50* | (2006.01) |
| *B01D 53/56* | (2006.01) |
| *B01D 53/68* | (2006.01) |

(52) U.S. Cl. ............ 423/220; 423/226; 423/228; 423/229; 423/242.1; 423/242.2; 423/242.7; 423/243.01; 423/243.08; 423/243.11; 423/235; 423/240 R; 423/241

(58) Field of Classification Search ............ 423/220, 423/226, 228, 229, 242.1, 242.2, 242.7, 243.01, 423/243.08, 243.11, 235, 240 R, 241
See application file for complete search history.

(56) References Cited

U.S. PATENT DOCUMENTS

| | | | | |
|---|---|---|---|---|
| 2,600,328 A | * | 6/1952 | Riesenfeld et al. | 423/228 |
| 3,658,462 A | * | 4/1972 | Van Scoy | 423/229 |
| 4,044,100 A | * | 8/1977 | McElroy, Jr. | 423/226 |
| 4,251,494 A | * | 2/1981 | Say | 423/228 |
| 6,969,418 B1 | | 11/2005 | Hu | |
| 7,541,011 B2 | * | 6/2009 | Hu | 423/220 |
| 2006/0104877 A1 | | 5/2006 | Cadours et al. | |
| 2007/0264180 A1 | * | 11/2007 | Carrette et al. | 423/228 |
| 2007/0286783 A1 | | 12/2007 | Carrette et al. | |

OTHER PUBLICATIONS

Howard Herzog et al.; Co2 Capture, Reuse and Storage Technologies for Mitigating Global Climate Change; DOE Order No. DE-AF-22-96PC01257; Jan. 1997; 70 pages; Cambridge, MA, US.

Amormvadee Veawab et al.; Solvent Formulation for Co2 Separation from Flue Gas Streams; 9 pages; Regina, SK, Canada, May 2001.

James T. Yeh et al.; Semi-batch Absorption and Regeneration Studies for Co2 Capture by Aqueous Ammonia; Fuel Processing Technology 86 (2005); pp. 1533-1546; Pittsburgh, PA US.

Kevin P. Resnik et al.; Aqua Ammonia Process for Simultaneous Removal of Co2, So2, and NOx; International Journal of Environmental Technology and Management vol. 4, Nos. 1/2, 2004; 19 pages; US.

Dr. R.H. Niswander et al.; A More Energy Efficient Product for Carbon Dioxide Separation; Separation Science and Technology, 28(1-3); 1993; pp. 565-578; Freeport, TX, US.

Amormvadee Veawab et al.; Solvent Formulation for Co2 Separation from Flue Gas Steams; 9 pages; Regina, SK, Canada, May 2001.

International Search Report and Written Opinion dated Jun. 28, 2010 in Int'l Application No. PCT/US10/30371.

* cited by examiner

*Primary Examiner*—Timothy C Vanoy
(74) *Attorney, Agent, or Firm*—Panitch Schwarze Belisario & Nadel LLP

(57) ABSTRACT

An process for efficiently deacidizing a gaseous mixture is described. The process utilizes a self-concentrating absorbent that absorbs an acid gas at reduced overall energy costs for the deacidizing operation.

12 Claims, 2 Drawing Sheets

SELF-CONCENTRATING ABSORBENT FOR ACID GAS SEPARATION

CROSS-REFERENCE TO RELATED APPLICATIONS

This application is a continuation-in-part patent application of U.S. patent application Ser. No. 12/250,257, filed on Oct. 13, 2008, issued as U.S. Pat. No. 7,718,151 on May 18, 2010 titled "Methods and Systems For Deacidizing Gaseous Mixtures," which is a continuation-in-part patent application of U.S. patent application Ser. No. 11/279,095, filed on Apr. 7, 2006, issued as U.S. Pat. No. 7,541,011 on Jun. 2, 2009, titled "Phase Transitional Absorption Method," published Oct. 11, 2007, as U.S. patent publication No. 20070237695 A1, both of which are hereby incorporated by reference herein in their entirety.

STATEMENT OF GOVERNMENT LICENSE RIGHTS

The U.S. Government has a paid-up license in this invention and the right in limited circumstances to require the patent owner to license others on reasonable terms as provided for by the terms of National Science Foundation SBIR Award No. IIP-0839217.

FIELD OF THE INVENTION

The present invention relates to a process for deacidizing a gaseous mixture using a self-concentrating absorbent. More particularly, the present invention relates to a method for the separation of an acid gas from a gaseous mixture using a self-concentrating absorbent, which reduces the overall energy costs for such deacidizing operation.

BACKGROUND OF THE INVENTION

Removal of acid gas from gas mixture is required for many processes, such as, deacidization of a raw natural gas or any other gaseous mixture that contains significant amounts of an acid gas, e.g., hydrogen sulfide ($H_2S$), carbon dioxide ($CO_2$), or similar contaminants. The deacidization process reduces the acid gas impurity in the gaseous mixture to acceptable levels. This is commonly done with an amine gas treatment process. Amine gas treatment processes are common in various types of industrial settings, such as refineries, natural gas processing plants, and petrochemical plants. Amine gas treatment processes include the processes utilizing aqueous solutions of amines to remove acid gas, such as $H_2S$ and $CO_2$.

A common deacidization process is gas-liquid absorption. Such process typically involves contacting a gaseous mixture containing an acid gas to be removed with an aqueous amine solution, whereby the amine solution is an absorbent that absorbs the acid gas. In industrial settings, the most commonly used amines are alkanolamines, such as monoethanolamine (MEA) and diethanolamine (DEA). The use of the alkanolamine methyldiethanolamine (MDEA) for $CO_2$ separation has recently become notable for use in industrial settings. Diisopropanolamine (DIPA) is currently used in the SULFINOL process and in the SCOT process for Claus plant tail acid gas purification.

In the typical gas-liquid absorption process, after an acid gas is absorbed into the absorbent in an absorption unit, the gas-rich absorbent is sent to a regeneration unit, where the gas-rich absorbent is treated and separated to regenerate the absorbed gas and the gas-lean absorbent. The regenerated gas-lean absorbent is then recycled back into the absorption unit and the acid gas is either collected or discharged, depending on the purpose of the user. In this type of gas-liquid absorption, the regeneration process accounts for greater than 80% of the total energy costs because the entire volume of the absorbent effluent must be regenerated in order to be reused in the absorption unit. In addition, the typical gas-liquid absorption process is limited to the use of an absorbent in the form of one liquid phase.

BRIEF SUMMARY OF THE INVENTION

It is now discovered that a method for deacidizing a gaseous mixture involving a self-concentrating absorbent increases the absorption rate of an acid gas from the gaseous mixture and reduces the overall energy costs for such deacidizing operation.

In one general aspect, embodiments of the present invention relate to a method for deacidizing a gaseous mixture comprising an acid gas. The method comprises:

contacting the gaseous mixture with an absorbent in an absorption unit, wherein the absorbent comprises an amine dissolved in a solvent at a first concentration;

allowing the absorbent to absorb the acid gas to form a concentrated-amine phase, wherein the concentrated-amine phase is mechanically separable from the remaining of the absorbent and comprises a concentrated amine at a concentration higher than the first concentration and an absorbed acid gas, wherein the concentrated amine comprises the amine or the amine having a chemical modification, and the absorbed acid gas comprises the acid gas or the acid gas having a chemical modification;

separating the concentrated-amine phase from the remaining of the absorbent;

cycling the remaining of the absorbent back into the absorption unit;

providing the concentrated-amine phase to a regeneration unit, so as to obtain the acid gas and the concentrated amine; and cycling the regenerated concentrated amine back into the absorption unit.

In an embodiment of the present invention, the absorbent and the absorbed acid gas move downward from the absorption unit to the separation unit by gravity, and the separated concentrated-amine phase moves downward from the separation unit to the regeneration unit by gravity.

In another general aspect, embodiments of the present invention relate to a system for deacidizing a gaseous mixture comprising an acid gas. The system comprises:

an absorption unit adapted to allow contact between the gaseous mixture and an absorbent comprising an amine dissolved in a solvent at a first concentration, wherein the absorbent absorbs the acid gas to form a concentrated-amine phase, wherein the concentrated-amine phase is mechanically separable from the remaining of the absorbent, and the concentrated-amine phase comprises a concentrated amine at a concentration higher than the first concentration and an absorbed acid gas, wherein the concentrated amine comprises the amine or the amine having a chemical modification, and the absorbed acid gas comprises the acid gas or the acid gas having a chemical modification a separation unit adapted to allow separation of the concentrated-amine phase from the remaining of the absorbent; and a regeneration unit adapted to allow regeneration of the concentrated-amine phase, so as to obtain the acid gas and the concentrated amine.

In an embodiment of the present invention, the absorption unit, the separation unit and the regeneration unit are in a single tower, wherein the separation unit is placed in a position lower than the absorption unit and the regeneration unit is placed in a position lower than the separation unit, so that after the gas absorption, the absorbent and the absorbed acid gas move downward from the absorption unit to the separation unit by gravity, and the concentrated-amine phase moves downward from the separation unit to the regeneration unit by gravity.

In yet another general aspect, embodiments of the present invention relate to a method for deacidizing a gaseous mixture comprising an acid gas. The method comprises:

contacting the gaseous mixture with an absorbent in an absorption unit, wherein the absorbent comprises an agent dissolved in a solvent at a first concentration, wherein the agent is selected from the group consisting of amino-acid salts, amides, alkaline salts, alkaline-earth salts, ammonium salts, ureas, alkaline metal phosphates, carbonates, borates, acid phosphites, phosphites, phosphonite, phosphinate, phosphonate, acid phosphates, pyrophosphites, bicarbonates, metaborates, diborates, tetraborates, pentaborates, and combinations thereof;

allowing the absorbent to absorb the acid gas to form a concentrated-agent phase, wherein the concentrated-agent phase is mechanically separable from the remaining of the absorbent and comprises a concentrated agent at a concentration higher than the first concentration and an absorbed acid gas, wherein the concentrated agent comprises the agent or the agent having a chemical modification, and the absorbed acid gas comprises the acid gas or the acid gas having a chemical modification;

separating the concentrated-agent phase from the remaining of the absorbent;

cycling the remaining of the absorbent back into the absorption unit;

providing the concentrated-agent phase to a regeneration unit, so as to obtain the acid gas and the concentrated agent; and cycling the regenerated concentrated agent back into the absorption unit.

In another general aspect, embodiments of the present invention relate to a system for deacidizing a gaseous mixture comprising an acid gas. The system comprises:

an absorption unit adapted to allow contact between the gaseous mixture and an absorbent comprising an agent dissolved in a solvent at a first concentration, wherein the agent is selected from the group consisting of amino-acid salts, amides, alkaline salts, alkaline-earth salts, ammonium salts, ureas, alkaline metal phosphates, carbonates, borates, acid phosphites, phosphites, phosphonite, phosphinate, phosphonate, acid phosphates, pyrophosphites, bicarbonates, metaborates, diborates, tetraborates, pentaborates, and combinations thereof;

wherein the absorbent absorbs the acid gas to form a concentrated-agent phase, the concentrated-agent phase is mechanically separable from the remaining of the absorbent, and the concentrated-agent phase comprises a concentrated agent at a concentration higher than the first concentration and an absorbed acid gas, wherein the concentrated agent comprises the agent or the agent having a chemical modification, and the absorbed acid gas comprises the acid gas or the acid gas having a chemical modification;

a separation unit adapted to allow separation of the concentrated-agent phase from the remaining of the absorbent; and a regeneration unit adapted to allow regeneration of the concentrated-agent phase, so as to obtain the acid gas and the concentrated agent.

Other aspects, features and advantages of the invention will be apparent from the following disclosure, including the detailed description of the invention and its preferred embodiments and the appended claims.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
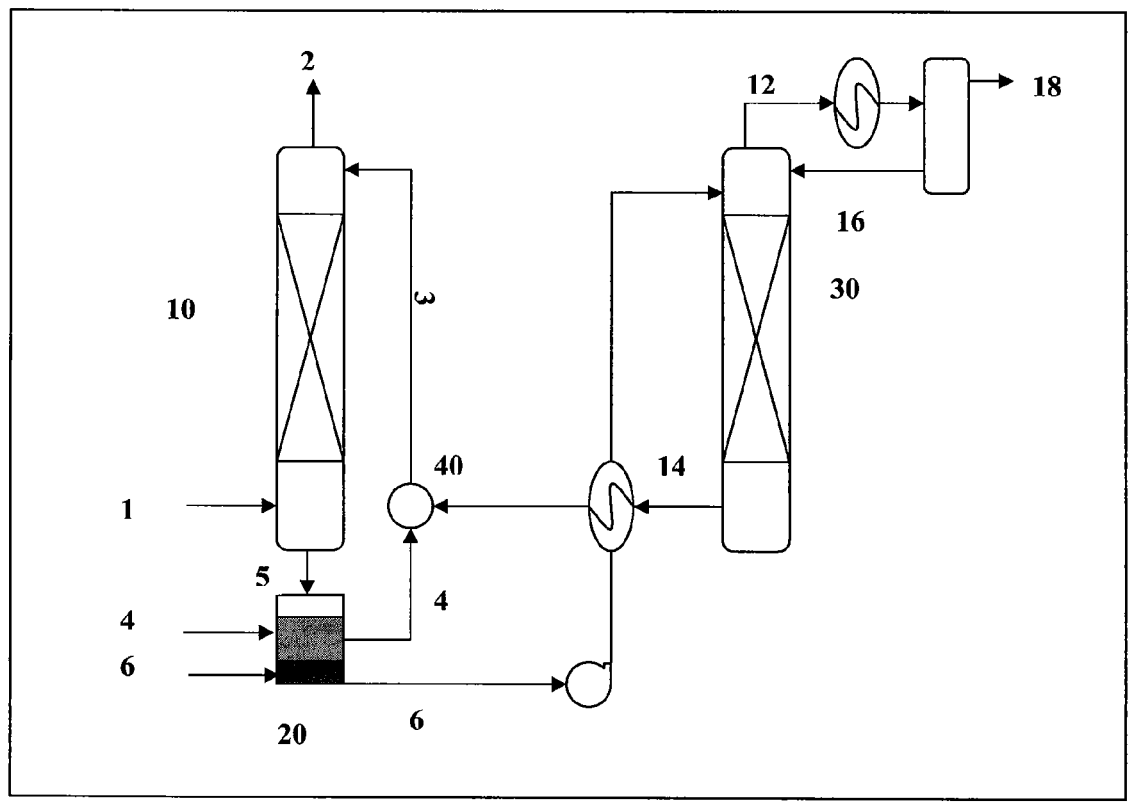
FIG. 1 is a flow diagram showing the steps of the deacidization process according to an embodiment of the present invention.

Unless defined otherwise, all technical and scientific terms used herein have the same meaning as commonly understood to one of ordinary skill in the art to which this invention pertains. Otherwise, certain terms used herein have the meanings as set in the specification. All patents, published patent applications and publications cited herein are incorporated by reference as if set forth fully herein. It must be noted that as used herein and in the appended claims, the singular forms "a," "an," and "the" include plural reference unless the context clearly dictates otherwise.

In one general aspect, the present invention relates to a process of deacidizing a gaseous mixture using a self-concentrating amine absorption, while minimizing energy costs and maximizing absorption rates.

According to an embodiment of the present invention, an absorbent and a gaseous mixture containing an acid gas to be removed are contacted in an absorption unit. The absorbent comprises an amine or an agent dissolved in a solution at a first concentration. During the absorption, amine or the agent in the absorbent is spontaneously concentrated into a concentrated-amine or concentrated-agent phase. After the absorption is complete, the concentrated-amine or concentrated-agent phase is mechanically separable from the remaining of the absorbent, i.e., the concentrated-amine or concentrated-agent phase does not form a solution with the remaining of the absorbent.

The acid gas to be removed can be, for example, one or more acid gases selected from the group consisting of carbon dioxide ($CO_2$), sulfur dioxide ($SO_2$), sulfur trioxide ($SO_3$), hydrogen sulfide ($H_2S$), carbon oxysulfide (COS), carbon disulfide ($CS_2$), mercaptans (RSH), nitric oxide (NO), nitric dioxide ($NO_2$), fluorides, HCl, and a combination thereof.

The absorption unit according to embodiments of the present invention can be, for example, an absorption column or a membrane contractor, or any other gas-liquid contacting units that are known to those skilled in the art.

It is readily appreciated by those skilled in the art that the absorbent can comprise one or more amines dissolved in a solvent. Examples of the amines include, but are not limited to monoethanolamine, diethanolamine, triethanolamine, ethanolamines, isopropanolamines, ethyleneamines, alkyl alkanolamines, methyldiethanolamine, piperidine, dibutylamine, diisopropylamine, derivatives thereof, or mixtures thereof.

The solvent can be aqueous or organic. For example, the aqueous solvent can be water, an aqueous solution of one or more salts, including, but not limited to, alkaline salts, ammonium salts, alkanolamine salts, alkaline-earth salts, or derivatives thereof. The organic solvent can comprise one or more components, including, but not limited to, alcohols, glycols, alkanes, unsaturated hydrocarbon, ethers, esters, aldehyde, ketones, glycol ethers, alkylene carbonates, dialkyl carbonates, sulfolane, and derivatives thereof, such as ionic liquids, polymers. The solvent can further be a combination of an aqueous solution and an organic solvent.

In a preferred embodiment, the organic solvent comprises a $C_8$ to $C_{12}$ alcohol.

The solvent can also be water insoluble or slightly water soluble solvent, such as water insoluble alcohol, glycol, or glycol ether. The solvent can further be ionic liquids or polymers.

In an embodiment of the present invention, the absorbent comprises an amine solution, including, but not limited to an alcohol, glycol or glycol ether solution of monoethanolamine, diethanolamine, triethanolamine, ethanolamines, isopropanolamines, ethyleneamines, alkyl alkanolamines, methyldiethanolamine, piperidine, dibutylamine, diisopropylamine, derivatives thereof, or mixtures thereof.

In an embodiment of the present invention, the amine can be another agent instead, the other agent can be amino-acids, amino-acid salts, amides, alkaline salts, ammonium salts, ureas, alkaline metal phosphates, carbonates, borates, acid phosphites, phosphites, phosphonite, phosphinate, phosphonate, acid phosphates, pyrophosphites, bicarbonates, metaborates, diborates, tetraborates, pentaborates, derivatives thereof, or combinations thereof. The solvent can be water, an aqueous solution of one or more salts, including, but not limited to, alkaline salts, ammonium salts, alkanolamine salts, alkaline-earth salts, ureas, alkaline metal phosphates, acid phosphites, phosphites, phosphonite, phosphinate, phosphonate, acid phosphates, pyrophosphites, carbonates, bicarbonates, borates, metaborates, diborates, tetraborates, pentaborates, or derivatives thereof. The organic solvent can comprise one or more components, including, but not limited to, alcohols, glycols, alkanes, unsaturated hydrocarbon, ethers, esters, aldehyde, ketones, glycol ethers, alkylene carbonates, dialkyl carbonates, sulfolane, and derivatives thereof, such as ionic liquids, polymers, such as, the absorbent comprises a carbonates or borates aqueous solution.

In an embodiment of the present application, the absorbent comprises a solution of an amine at a concentration selected from the group consisting of 0.1%, 1%, 5%, 10%, 15%, 20%, 25%, 30%, 35%, 40%, 45%, 50%, 55%, 60%, 65%, 70%, 75%, 80%, 85%, 90%, etc.

According to embodiments of the present invention, when the acid gas contacts with the absorbent, the acid gas can be absorbed physically, chemically, or both physically and chemically. After physical absorption, the acid gas is absorbed in the absorbent, mainly in the concentrated-amine phase, without being chemically modified. After chemical absorption, however, the acid gas is absorbed in the absorbent, mainly in the concentrated-amine phase, after being chemically modified, e.g., in a reaction product of the amine and the acid gas.

In one embodiment of the present invention, the reaction product of the amine with the acid gas is substantially insoluble in the solvent.

The concentrated-amine phase comprises a concentrated amine at a concentration higher than the first concentration and an absorbed acid gas. The concentrated amine can be the amine or the amine having a chemical modification, for example, a reaction product resulting from a chemical reaction between the amine and the acid gas. The absorbed acid gas can be the acid gas or the acid gas having a chemical modification, for example, a reaction product resulting from a chemical reaction between the amine and the acid gas. The concentrated-amine phase can exist as a single phase, e.g., a solution of amine. The concentrated-amine phase can also contain multiple phases.

Because the absorbent forms the concentrated-amine phase spontaneously upon absorption of the acid gas, the absorbent is also referred to as the self-concentrating amine absorbent.

The absorbed acid gas accumulates in the concentrated-amine phase.

After the absorbent absorbs the acid gas, the purified gaseous mixture, with the acid gas being removed or significantly reduced, is released from the absorption unit. The released purified gaseous mixture can be collected or disposed of, depending on the user's purpose.

After the absorbent absorbs the acid gas, the contents of the absorption unit are provided to a separation unit to separate the concentrated-amine phase from the remaining of the absorbent. The formation of the concentrated-amine phase can proceed before, simultaneously, or after the contents of the absorption unit are provided to the separation unit.

In one embodiment of the present invention, the contents of the absorption unit are provided to the separation unit after the complete formation of the concentrated-amine phase.

In another embodiment of the present invention, the contents of the absorption unit are provided to the separation unit before the complete formation of the concentrated-amine phase.

The separation can be achieved using phase separation methods known to those skilled in the art in view of the present disclosure. For example, the concentrated-amine phase can be separated based on the density of the phase, e.g., by a separating drum. The concentrated-amine phase can also be separated based on other properties of the phase, e.g., by a membrane that has different permeability to the concentrated-amine phase and the remaining of the absorbent.

The separating step of the present invention can be accomplished utilizing one or more types of phase settlers or phase separation units known in the art as suited for separation of bulk liquid phases. Some examples include simple settlers, filtration, centrifugation, membrane, etc.

After the separation, the remaining of the absorbent contains mostly the solvent. It can also contain the amine at a concentration much lower than the first concentration. The remaining of the absorbent can further contain a small amount of the absorbed acid gas. After the separation, the remaining of the absorbent is cycled back into the absorption unit for reuse.

The separated concentrated-amine phase is routed to a regeneration unit, where the concentrated-amine phase is treated to produce or regenerate the amine and the acid gas. The regeneration process according to embodiments of the present invention can be accomplished by regeneration methods known to those skilled in the art in view of the present disclosure. Exemplary regeneration methods include, but are not limited to, thermal decomposition, gas stripping, steam stripping, distillation, treatment through a membrane contractor, pervaporization, pressure differential treatment, and a combination thereof.

The regenerated acid gas is collected or disposed of depending on the purpose of the user. The regenerated amine is cycled back into the absorption unit for reuse.

In an embodiment of the present invention, the contents of the absorbent are transferred from one unit to another unit by a pump. In other embodiments of the present invention, the contents of the absorbent are transferred between at least some of the units by gravity.

In an embodiment of the present invention, the contents of the absorbent move downward from the absorption unit to the separation unit by gravity.

In another embodiment of the present invention, the separated concentrated-amine phase moves downward from the separation unit to the regeneration unit by gravity.

In still another embodiment of the present invention, the contents of the absorbent move downward from the absorption unit to the separation unit, and the separated concentrated-amine phase moves downward from the separation unit to the regeneration unit, all by gravity.

In another general aspect, the present invention relates to a system for deacidizing a gaseous mixture comprising an acid gas. The system comprises an absorption unit, a separation unit and a regeneration unit as those described herein.

In an embodiment of the present invention, the separation unit is placed in a position lower than the absorption unit, so that the contents of the absorbent move downward from the absorption unit to the separation unit by gravity.

In another embodiment of the present invention, the regeneration unit is placed in a position lower than the separation unit, so that the separated concentrated-amine phase moves downward from the separation unit to the regeneration unit by gravity.

In still another embodiment of the present invention, the absorption unit, the separation unit and the regeneration unit are placed in a single tower, wherein the separation unit is placed in a position lower than the absorption unit and the regeneration unit is placed in a position lower than the separation unit, so that the gas-rich absorbent moves downward from the absorption unit to the separation unit by gravity, and the separated concentrated-amine phase moves downward from the separation unit to the regeneration unit by gravity.

The deacidization process according to embodiments of the present invention can be used to remove an impurity acid gas from a gaseous mixture, in which case the impurity acid gas can be disposed of, with improved efficiency. Alternatively, the deacidization process according to embodiments of the present invention can be used to collect an acid gas of interest from a gaseous mixture, with improved efficiency.

In one embodiment of the present invention, the solvent in an absorbent according to an embodiment of the present invention serves to increase the absorption rate of the acid gas. The acid gas is absorbed into the absorbent at a rate greater than that if it were directly absorbed by the amine.

In an aspect of the present invention, the energy to be expended for the regeneration process is reduced because only part of the absorbent, the concentrated-amine phase, needs to be regenerated, while the remaining of the absorbent can immediately be recycled for reuse in the absorption unit.

In yet another aspect of the present invention, the energy to be expended for the deacidization process is further reduced by incorporating two or more of the units used in the process in a single tower, so that the various components can be transferred between some of the units by gravity, instead of pumping. The use of multiple units in a single tower is enabled and becomes practical, because of the relatively smaller size of the concentrated-amine phase that needs to be regenerated. In a conventional liquid-gas separation process, the volume of the gas-rich absorbent that needs to be regenerated is significantly larger than that of the concentrated-amine phase according to embodiments of the present invention. Thus, in the conventional methods, a single tower containing the absorption unit and the regeneration unit would be too tall to be practical.

FIG. 1 illustrates a particular embodiment of the present invention. A gaseous mixture 1 containing an acid gas to be removed and an absorbent 3 are provided into an absorption unit 10. The gaseous mixture 1 and the absorbent 3 contact with each other in the absorption unit 10. After the acid gas is absorbed in the absorbent 3 in the absorption unit 10, the purified gaseous mixture 2 is released from the absorption unit 10. The gas-rich absorbent 5 is sent to a separation unit 20, such as a gravity settler tank, for separating the concentrated-amine phase 6 from the remaining of the absorbent 4. After the separation, the remaining of the absorbent 4, comprising most or all components of the solvent and little or none of the amine and little or none of the absorbed acid gas, is cycled back into the absorption unit 10 for reuse, with or without further treatment. The separated concentrated-amine phase 6, containing most or all of the amine and the absorbed acid gas, both with or without chemical modification, optionally one or more components of the solvent, is provided for regeneration.

Referring to FIG. 1, the separated concentrated-amine phase 6 is routed to a regeneration unit 30, where the concentrated-amine phase 6 is treated to separate the absorbed acid gas 12 from the rest of the concentrated-amine phase, which is the gas-lean phase 14. The absorbed acid gas 12 is further treated to separate the acid gas 18 from the rest 16, which may contain the amine and one or more components of the solvent that react with the acid gas during the absorption of the acid gas and/or the transfer of the absorbed acid gas. The separated acid gas 18 can be disposed of or collected, depending on the user's purpose. The rest 16 is regenerated as part of the gas-lean phase 14. The gas-lean phase 14, which contains the regenerated amine and optionally one or more components of the solvent, is cycled back into the absorption unit 10 for reuse, with or without further treatment.

As shown in FIG. 1, the remaining of the absorbent 4 from the separation unit 20 and the gas-lean phase 14 from the regeneration unit 30 are mixed together in a mixer 40. The resulting absorbent 3 is then cycled back into the absorption unit 10 for reuse. According to other embodiments of the present invention, the remaining of the absorbent 4 and the gas-lean phase 14 can each be cycled back into the absorption unit 10 for reuse without being first mixed together.

Although not shown in FIG. 1, in view of the present disclosure, it is readily appreciated by those skilled in the art that, in addition to the cycled back components of the absorbent 3, additional one or more components of the absorbent 3 can be added to compensate for the loss of the one or more components during the deacidizing process.

Figure 2:
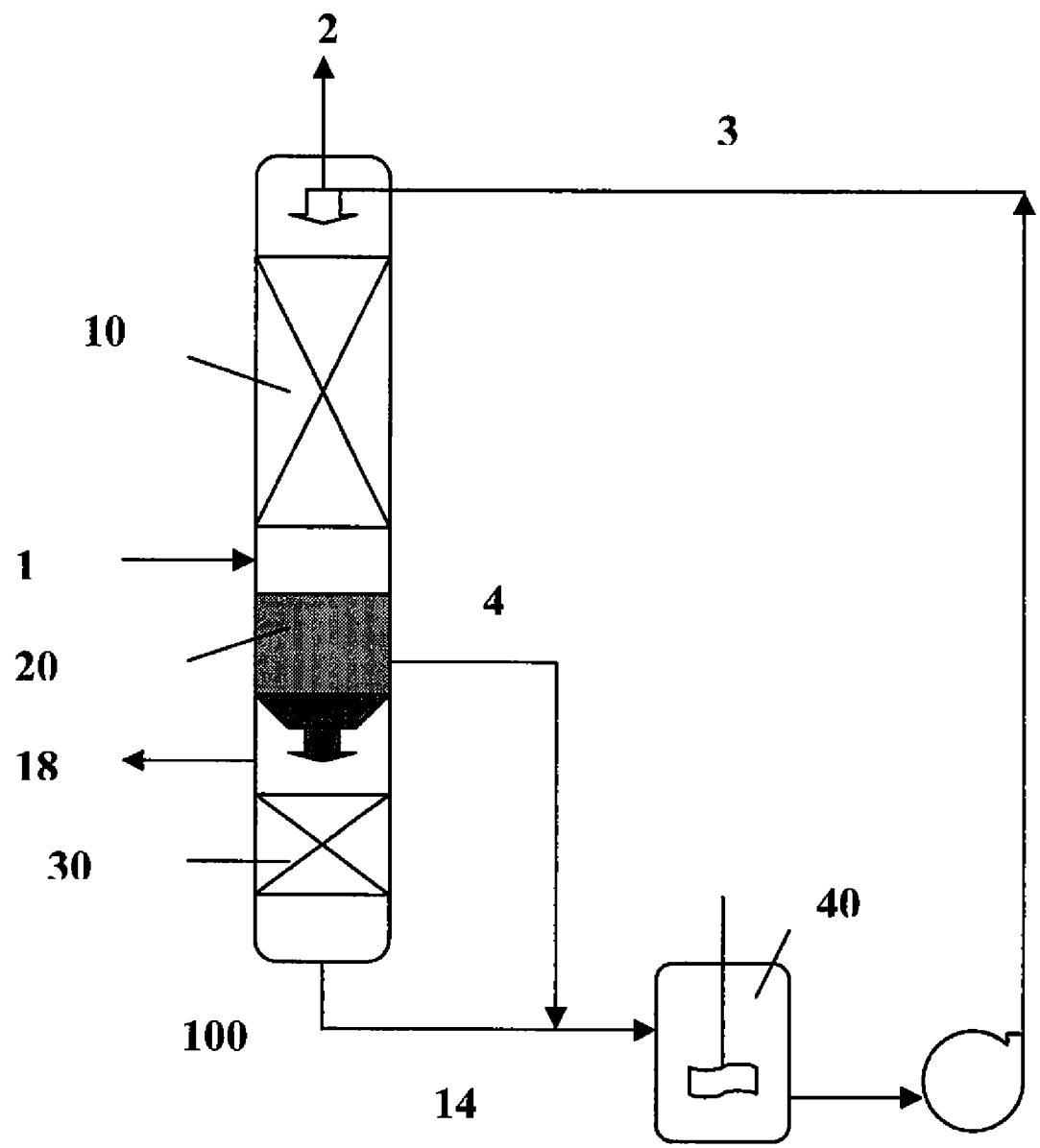
FIG. 2 is a flow diagram showing the steps of the deacidization process according to another embodiment of the present invention.

FIG. 2 illustrates another particular embodiment of the present invention. In this process, the absorption unit 10, separation unit 20 and regeneration unit 30 are grouped inside a single tower 100. The gas-rich absorbent from the absorption unit 10 flows downward into the separation unit 20 by gravity, so as to separate the concentrated-amine phase and the remaining of the absorbent 4. After separation, the concentrated-amine phase flows downward into the regeneration unit 30, by gravity, where the regenerated acid gas 18 and the gas-lean phase 14 are obtained. The remaining of the absorbent 4 and the gas-lean phase 14 further flow downward into the mixer 40, and are mixed in the mixer 40 to obtain the absorbent 3. The absorbent 3 is pumped back into the absorption unit 10, where it forms contact with the gaseous mixture 1, to start another cycle.

According to other embodiments of the present invention, the remaining of the absorbent 4 and the gas-lean phase 14 can each be pumped back into the absorption unit 10 for reuse without being first mixed together.

Again, in addition to the cycled back components of the absorbent 3, additional one or more components of the absorbent 3 can be added to compensate for the loss of the one or more components during the deacidizing process.

In this embodiment, no pumping energy is required for liquid transfer from the absorption unit 10 to the regeneration unit 30, thus achieves further energy saving.

The following examples illustrate the invention but are in no way intended to limit the scope of the present invention.

Example 1

The absorbent was made of 20% by volume of the amine, monoethanolamine (MEA), and 80% by volume of the solvent, iso-octanol. The absorbent was contacted with a gaseous mixture containing an acid gas, carbon dioxide ($CO_2$), in a stirring cell absorption unit at about 25-45° C., 1 atm. MEA in the absorbent was concentrated spontaneously into a concentrated-amine phase, which contained MEA and the reaction product of MEA and $CO_2$.

After the absorption, the absorbent was settled to separate by gravity the concentrated-amine phase from the remaining of the absorbent. After the separation, the remaining of the absorbent, which contains most of the iso-octanol and optionally some MEA and absorbed $CO_2$, was cycled back into the absorption unit for reuse. In the concentrated-amine phase, the concentration of the total MEA, which includes the chemically unmodified MEA and the reaction product of MEA and $CO_2$, was about 70% by volume.

The separated concentrated-amine phase was forwarded to a regenerator and was treated to obtain the regenerated MEA and $CO_2$ by the method of heating the concentrated-amine phase. The regenerated MEA was mixed with the remaining of the absorbent. The mixture was cycled back to the stirring cell absorption unit to complete the cycle.

The $CO_2$ released from the regeneration process was collected.

Example 2

This example illustrates the absorption of $CO_2$ by a carbonate aqueous solution.

An absorbent is made of carbonate aqueous solution. The absorbent is contacted with a gas mixture containing acid gas, carbon dioxide ($CO_2$), in a stirring cell absorption unit at 50° C., 1 atm.

During the absorption, carbonate in aqueous solution reacts with $CO_2$ to form bicarbonate. After absorption, the absorbent is cooled to 25° C. and the bicarbonate is crystallized. The bicarbonate solid phase is separated from the absorbent. It is then forwarded to a regeneration section and is treated to obtain the regenerated carbonate and $CO_2$ by the method of heating the solid phase of bicarbonate. The regenerated carbonate is dissolved in aqueous solution and cycled back to the stirring cell absorption unit to complete the cycle.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for deacidizing a gaseous mixture comprising an acid gas, comprising:

contacting the gaseous mixture with an absorbent in an absorption unit, wherein the absorbent comprises an amine dissolved in a solvent at a first concentration;

allowing the absorbent to absorb the acid gas to form a concentrated-amine phase, wherein the concentrated-amine phase is mechanically separable from the remaining of the absorbent and comprises a concentrated amine at a concentration higher than the first concentration and an absorbed acid gas, wherein the concentrated amine comprises the amine or the amine having a chemical modification, and the absorbed acid gas comprises the acid gas or the acid gas having a chemical modification;

separating the concentrated-amine phase from the remaining of the absorbent;

cycling the remaining of the absorbent back into the absorption unit without regeneration;

providing the concentrated-amine phase to a regeneration unit, so as to obtain the acid gas and the concentrated amine; and cycling the regenerated concentrated amine back into the absorption unit.

2. The method of claim 1, wherein the acid gas is selected from the group consisting of carbon dioxide ($CO_2$), sulfur dioxide ($SO_2$), sulfur trioxide ($SO_3$), hydrogen sulfide ($H_2S$), carbon oxysulfide (COS), carbon disulfide ($CS_2$), mercaptans (RSH), nitric oxide (NO), nitric dioxide ($NO_2$), fluorides, HCl, HF and a combination thereof.

3. The method of claim 1, wherein the amine is selected from the group consisting of monoethanolamine, diethanolamine, triethanolamine, ethanolamines, isopropanolamines, ethyleneamines, alkyl alkanolamines, methyldiethanolamine, piperidine, dibutylamine, diisopropylamine, and a combination thereof.

4. The method of claim 1, wherein the solvent comprises one or more components selected from the group consisting of alcohols, glycols, alkanes, unsaturated hydrocarbon, ethers, esters, aldehydes, ketones, glycol ethers, alkylene carbonates, dialkyl carbonates, sulfolane, ionic liquids, polymers, water, an aqueous solution containing one or more salts selected from alkaline salts, ammonium salts, alkanolamine salts, or alkaline-earth salts, and derivatives thereof.

5. The method of claim 4, wherein the solvent comprises a $C_8$ to $C_{12}$ alcohol.

6. The method of claim 1, wherein the absorbent comprises at least one amine selected from the group consisting of monoethanolamine, diethanolamine, piperidine, dibutylamine, or diisopropylamine, triethanolamine, ethanolamines, isopropanolamines, ethyleneamines, alkyl alkanolamines and methyldiethanolamine, and the amine is dissolved in a solvent comprising at least one of a $C_8$-$C_{12}$ alcohol, glycol and glycol ether.

7. The method of claim 1, wherein the absorption unit is an absorber, a membrane contactor, and any equipment that provides gas liquid contact.

8. The method of claim 1, wherein the solvent increases the absorption of the acid gas into the absorbent as compared to the absorption of the acid gas by the amine alone.

9. The method of claim 1, wherein after the absorbent absorbs the acid gas to form a gas-rich absorbent, the gas-rich absorbent moves downward from the absorption unit to the separation unit by gravity.

10. The method of claim 1, wherein after the step of separation, the concentrated-amine phase moves downward from the separation unit to the regeneration unit by gravity.

11. A method for deacidizing a gaseous mixture comprising an acid gas, comprising:
contacting the gaseous mixture with an absorbent in an absorption unit, wherein the absorbent comprises an agent dissolved in a solvent at a first concentration, wherein the agent is selected from the group consisting of amino-acid salts, amides, alkaline salts, alkaline-earth salts, ammonium salts, ureas, alkaline metal phosphates, carbonates, borates, acid phosphites, phosphites, phosphonite, phosphinate, phosphonate, acid phosphates, pyrophosphites, bicarbonates, metaborates, diborates, tetraborates, pentaborates, and combinations thereof;
allowing the absorbent to absorb the acid gas to form a concentrated-agent phase, wherein the concentrated-agent phase is mechanically separable from the remaining of the absorbent and comprises a concentrated agent at a concentration higher than the first concentration and an absorbed acid gas, wherein the concentrated agent comprises the agent or the agent having a chemical modification, and the absorbed acid gas comprises the acid gas or the acid gas having a chemical modification;
separating the concentrated-agent phase from the remaining of the absorbent;
cycling the remaining of the absorbent back into the absorption unit without regeneration;
providing the concentrated-agent phase to a regeneration unit, so as to obtain the acid gas and the concentrated agent; and
cycling the regenerated concentrated agent back into the absorption unit.

12. The method of claim 11, wherein the solvent comprises water, an aqueous solution containing one or more salts selected from alkaline salts, ammonium salts, alkanolamine salts, alkaline-earth salts, phosphates, acid phosphites, phosphites, phosphonite, phosphinate, phosphonate, acid phosphates, pyrophosphites, carbonates, bicarbonates, borates, metaborates, diborates, tetraborates, or pentaborates.

* * * * *